Figure 1:
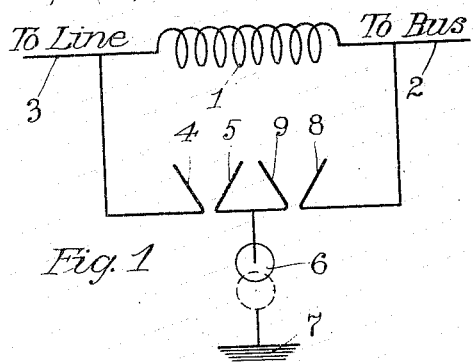

A. HERZ.
PROTECTING MEANS FOR ELECTRIC CIRCUITS.
APPLICATION FILED OCT. 2, 1915.

Patented Jan. 23, 1917.

Inventor
Alfred Herz
By Brown, Hanson & Boettcher
Attys.

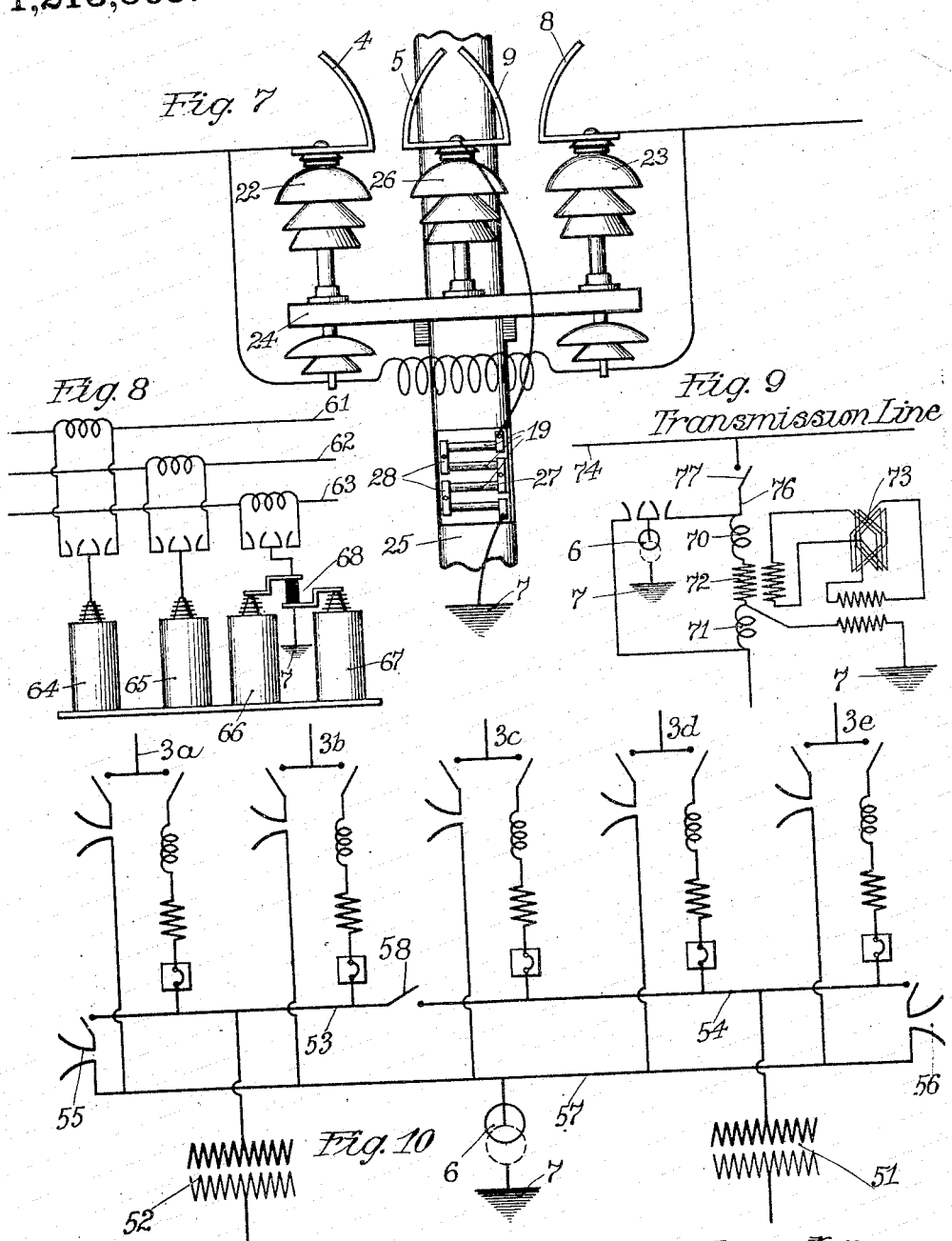

A. HERZ.
PROTECTING MEANS FOR ELECTRIC CIRCUITS.
APPLICATION FILED OCT. 2, 1915.
1,213,365.
Patented Jan. 23, 1917.
3 SHEETS—SHEET 3.
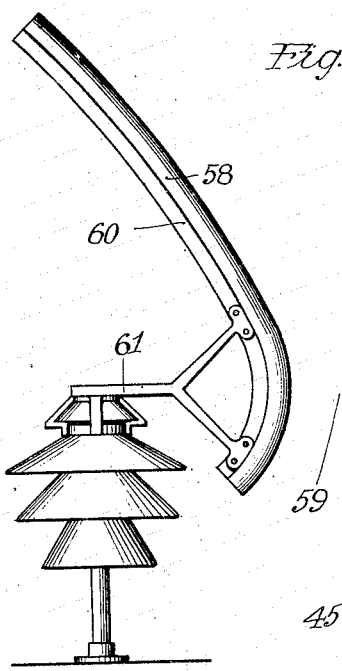
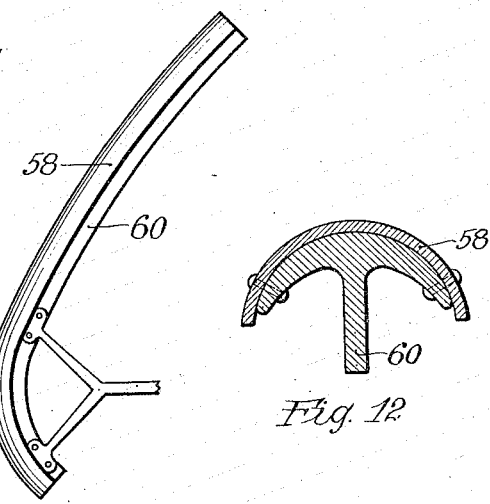
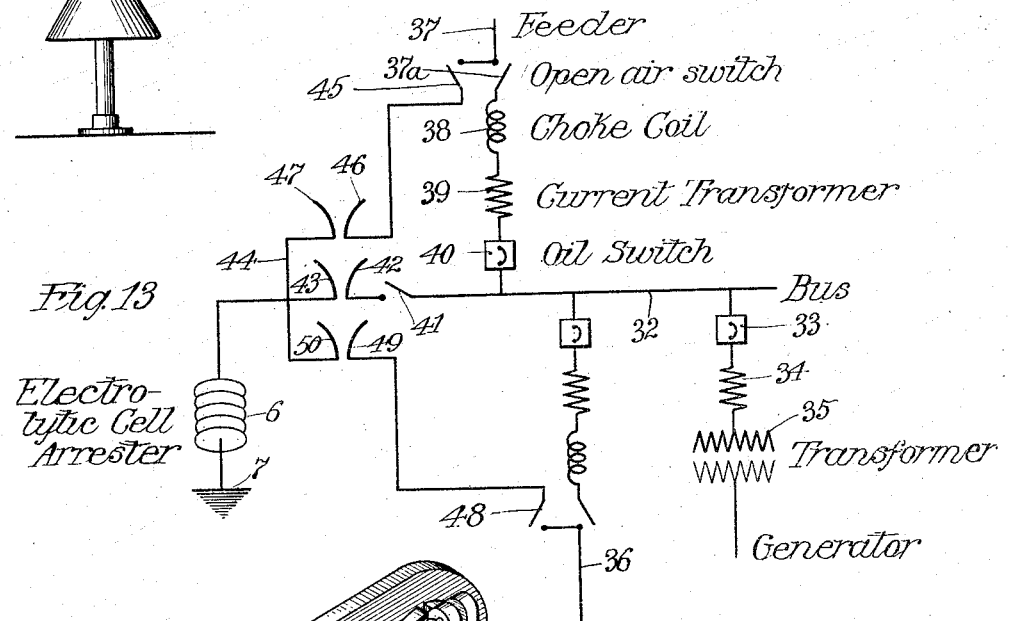
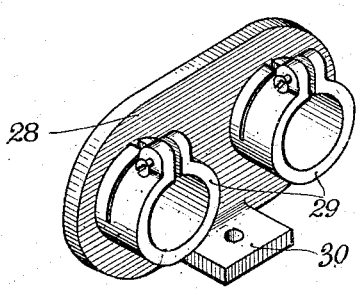
Inventor
Alfred Herz
BY Brown, Hanson & Boettcher
Attys.

UNITED STATES PATENT OFFICE.

ALFRED HERZ, OF CHICAGO, ILLINOIS, ASSIGNOR TO DELTA-STAR ELECTRIC COMPANY, OF CHICAGO, ILLINOIS, A CORPORATION OF ILLINOIS.

PROTECTING MEANS FOR ELECTRIC CIRCUITS.

1,213,365.   Specification of Letters Patent.   Patented Jan. 23, 1917.

Application filed October 2, 1915. Serial No. 53,667.

*To all whom it may concern:*

Be it known that I, ALFRED HERZ, a citizen of the United States, residing at Chicago, in the county of Cook and State of Illinois, have invented a certain new and useful Improvement in Protecting Means for Electric Circuits, of which the following is a full, clear, concise, and exact description, reference being had to the accompanying drawings, forming a part of this specification.

My invention relates to protecting means for electric circuits, and aims to provide an improved potential surge protector for transmission lines and the like.

The problem of protecting transmission lines and central or substation apparatus from potential surges has always been of importance. As the capacities of power systems have been increased and higher voltages employed, the problem has become acute. In a system of large capacity, the switching operations may become of such size and involve the sudden change of such large forces that disturbances capable of serious damage are caused. The greater the extent of the system, the greater is the possibility for damage that may be done. A short circuit upon one part of a large capacity system may be of much greater severity than if it occurred in a system of smaller capacity, and a short circuit of this nature often causes oscillation which results in high potentials and high frequency disturbances. The line or the apparatus may be in such a condition, that upon the initiation of such oscillatory disturbances a resonant effect will be caused, and a standing wave of potential created, which is capable of great damage.

The employment of high potentials greatly complicates the problem by increasing the difficulties of insulation and by the increased effect of the condensive capacity of a system or the various features of apparatus. Horn and multigap arresters were brought out early in the development of the art, but these devices in effecting relief, often cause greater disturbances than the disturbance they are meant to correct. The electrolytic arrester often termed the aluminum cell arrester was then developed, and it in conjunction with a spark gap for separating the arrester normally from the line, has been accepted at this stage of the art as an efficacious type of lightning or potential arrester. The electrolytic cell arrester cannot advantageously be connected directly to the line to protect the same, because of a constant flow of current, and the consequent heating that results. But as it is found that the potential wave often passes by the gap, refusing to pass to ground, and going on and damaging apparatus on the line beyond the arrester, it was found essential to provide some means for compelling the potential wave to jump the gap and go to ground through the arrester. For this purpose choke coils are installed in series in the line and the arrester is installed on the side of the coil upon which the disturbance originates, so that the potential wave will be halted or checked to the extent required to compel it to go to ground. The choke coils are of low impedance for normal frequencies and for gradual changes of potential, but to high frequencies or steep wave fronts, they are of very considerable impedance. However, the very thing that makes a choke coil valuable to localize the effect of a disturbance, also localizes the influence of the protective device. A disturbance arising on the opposite side of the choke coil is completely shut off from the arrester, as a consequence that side of the line or system is entirely unprotected. The result has been that generally no arrester has been installed on a transmission line other than at the end of the line entering a station. But all the dangerous rises of potential do not arise upon the transmission system and I have observed that potential surges of considerable magnitude often appear within the station, and as they occur on the high potential bus bars and have opportunity for damaging a number of costly pieces of apparatus, they are very dangerous. It is also to be noted that this condition is extremely dangerous to workmen or attendants in a station.

I have observed the formation of waves of potential within a station due to a peculiar resonant condition of the system and apparatus. As the choke coils of the various feeder lines shut off the potential from discharging through any of the arresters, the potential is built up until it becomes so great that something gives way and serious damage results.

My invention aims to give complete protection to all the apparatus of a transmission system at the least possible cost, and to provide an improved system of protection of the line and apparatus on both sides of a choke coil.

I shall now describe my invention in connection with the accompanying drawings, which illustrate the application of my invention to a number of different situations and illustrate also a number of incidental improvements in apparatus which I have made.

Figure 2:
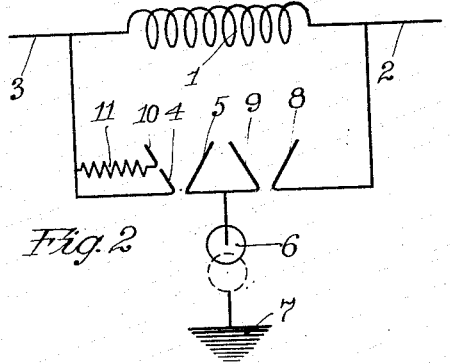
Figure 3:
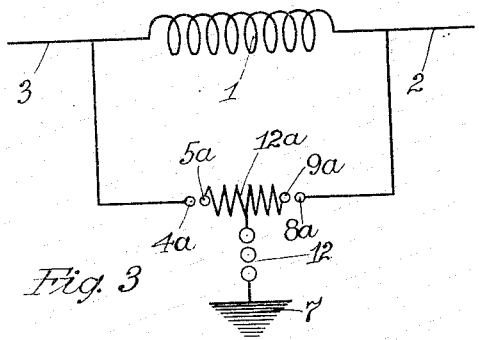
Figure 4:
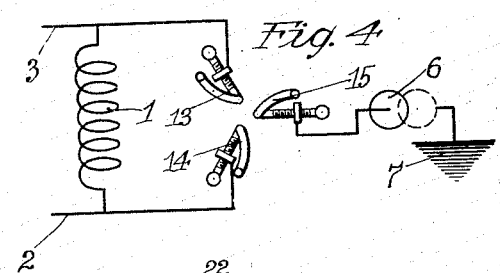
Figure 5:
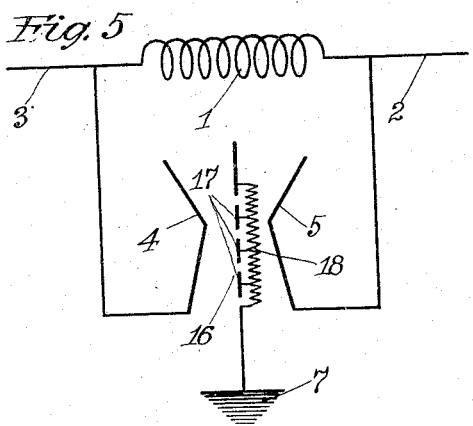
Figure 6:
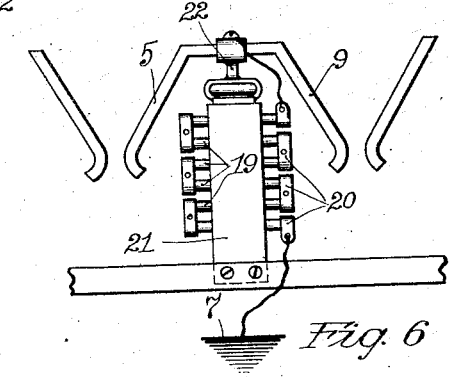

Figure 1 is a diagram illustrating the connection of the electrolytic arrester through a horn gap to each side of a choke coil. Fig. 2 is a similar diagram illustrating in addition, the charging resistance which may be employed to charge the electrolytic arrester. Fig. 3 illustrates diagrammatically a protective system employing a multigap arrester. Fig. 4 illustrates a system in which the gap electrodes are adjustable with respect to each other. Fig. 5 is a diagram of a system employing a different type of arrester. Fig. 6 illustrates a pair of gaps in which the common electrode is connected to ground through an improved form of resistance. Fig. 7 illustrates the manner in which the apparatus may be installed upon a pole or the like. Fig. 8 illustrates diagrammatically the connection of the arrester to a three phase system. Fig. 9 illustrates my invention applied to the metering apparatus of a branch circuit. Fig. 10 is a diagram of a high potential bus bar with a number of feeder lines leading off to various feeder circuits and a common lightning bus bar for the same. Fig. 11 is a fragmentary elevation of a type of horn gap which I employ. Fig. 12 is a sectional view of one of the horns. Fig. 13 is a diagram illustrating the application of my invention, and Fig. 14 is a perspective view of a form of end clip employed to grip the ends of adjacent resistance rods for the resistance arrester of the type shown in Figs. 5, 6 and 7.

In Fig. 1 I have shown the choke coil 1 connected in series with the line, leading on one side by means of the wire 2 to the high tension bus in the station, and on the other side by wire 3 to the feeder circuit. The line 3 is connected to the horn gap electrode 4, the other electrode 5 being connected to the electrolytic cell or cells 6 which I term the electrolytic arrester. The electrolytic arrester 6 has a ground connection 7 for discharging the potential to ground. The wire 2 which leads to the bus is connected to a horn gap electrode 8 which has a coöperating electrode 9, also connected to the electrolytic arrester 6. The choke coil 1 is thus provided with a normally open shunt, this shunt being open at the spark gaps formed by the electrodes 4, 5 and 8, 9. The central part of the shunt is connected to ground through a current limiting device 6, in this case indicated as an electrolytic cell or cells.

A potential wave arising on the feeder line 3 will travel toward the choke coil 1, the impedance of which will be so great that the potential wave will not pass therethrough, but will be discharged across the electrode 4, 5 to the electrolytic arrester 6 and thence to ground 7. Similarly a disturbance arising within the central station or on the high potential bus will travel toward the choke coil 1 but will be prevented from going out on the line by the choke coil, and will then discharge across the gap 8, 9 to the electrolytic arrester 6 and thence to ground. If the disturbance is of a very serious character some of the potential may travel across both gaps 4, 5 and 8, 9 but the wave will be so flattened out by such action that no serious damage will be done by such wave after traversing the gap. In case of total failure of a particular arrester the line is not totally deprived of protection as the normally open shunt about the inductance coil 1 by-passes the surges to the other side of the line where the same may be either absorbed in the line or passed on to the nearest arrester. A certain amount of the energy is at the same time dissipated in the gaps in the shunt. The gaps are preferably adjustable so that they may be set for different values on opposite sides of the choke coil 1. In Fig. 2 I have shown a similar scheme in which I employ an auxiliary electrode 10 and a charging resistance 11 for charging the electrolytic arrester 6. It is a well known fact that the electrolytic arrester to be effective should be charged by application of potential of the lines thereto at regular intervals so as to maintain the film upon the aluminum cells of the arrester. Only one of the horn gaps need be supplied with the charging resistance. It is obvious that either the electrode 4 or the electrode 8 may thus be supplied with the auxiliary electrode and resistance. When the aluminum cell 6 is to be charged the horn electrodes 5 and 10 are connected in any well known manner so that charging current flows from the line through the resistance 11 and the aluminum cell 6 in series to ground.

In the system of Fig. 3 I employ a multigap arrester 12 which is connected to ground 7 at its lower end and at its upper end is connected to the middle point of a resistance 12$^a$. Instead of employing horn gap electrodes cylindrical or spherical electrodes 4$^A$, 5$^A$ and 8$^A$, 9$^A$, may be employed as the multigap arrester 12 is depended upon for breaking the dynamic arc. The electrodes are adjustable so that different speeds of action may be obtained on opposite sides of the choke coil 1. The resistance 12$^a$ plays an important part in this system in that a discharge coming in from the line will pass to ground through the multigap arrester 12 through half of the resistance 13 and part of the same will pass on to the high tension bus bar but due to the fact that it must pass through the entire resistance 13, the wave is considerably flattened out and hence is not likely to cause any damage. In a similar manner a potential wave arising in the station will have an opportunity for discharging to ground 7 or for discharging part of the same to the line 3 in order to dissipate its energy as rapidly as possible.

In the system shown in Fig. 4 I have connected the line 3 to an adjustable horn gap electrode 13, and the bus side 2 to the adjustable horn gap electrode 14. Another adjustable horn gap electrode 15 is common to both the electrodes 13 and 14, and is connected to the electrolytic arrester 6 to ground at 7. The three electrodes form an adjustable spark gap between the sides of the line and between each side of the line and ground.

In Fig. 5 I have illustrated a well known type of arrester as applied to the choke coil 1. The horns 4 and 5 are connected to the line and bus bar respectively and the central electrode 16 is connected to ground at 7. This electrode comprises a series of short metal sections 17 connected together by a resistance 18.

In Fig. 6 I have illustrated an improved structure in which the horn electrodes 5 and 9 are connected together at their top, being formed out of a single piece of metal and connected through a resistance to ground at 7. The resistance is built up of a number of resistance rods 19 connected together at their outer ends by suitable metallic clips 20. These resistance rods 19 are mounted in a block of porcelain 21, which supports at its upper end a bracket 22 bearing the electrodes 5, 9. The porcelain block 21 is mounted upon a cross arm or suitable support. A discharge taking place across the gap 4, 5 will pass through the bracket to the first resistance rod 19, and if the discharge is of considerable gravity it will jump the gap between successive metal clips 20 and pass directly to ground at 7. After the passage of the discharge the current will tend to follow the path of the resistance rod and will thus be limited to a safe value. If a resistance rod 19 breaks, it does not disable the arrester as the end will drop down upon the next resistance or if broken completely away the arc or discharge will jump across the gap between adjacent ends and operate normally.

Fig. 7 shows the manner in which a commercial installation may be made. The electrodes 4 and 8 are mounted upon insulators 22 and 23 which are secured by suitable pins to a bar or piece of channel iron 24. The bar 24 may be secured to the cross arm or a pair of cross arms on the pole 25. The electrodes 5 and 9 are supported upon an insulator 26 which is also mounted upon the bar 24. These electrodes 5 and 9 are connected to the resistance 27 which is constructed in a manner similar to the resistance shown in Fig. 6. The resistance rods 19 are secured together by means of metal clamps 28 shown in Fig. 14. The connecting pieces 28 are provided with clamps 29 for gripping the ends of the resistance rods. A lug or bracket 30 is provided for securing the connecting pieces 28 to a suitable baseboard or slab of slate marble or the like which may be mounted upon the pole 25. The lowermost clip is connected to the ground connection 7. The horn electrodes 4, 5 and 9, 8 may be constructed as shown in Fig. 11. The electrode there shown consists of a stamping 58 of sheet metal for giving a curved face. At the point where the air gap is the least the electrode is curved so that at this minimum air gap 59, the electrodes will present toward each other substantially spherical surfaces. As is well known, the voltage required to break down the gap between spherical surfaces is more nearly constant than between other forms of electrodes. The sheet metal electrodes 58 may be reinforced and supported by suitable castings 60 which may be riveted to the sheet metal part. The reinforcing bracket 60 is secured to an arm 61 and supported on the top of an insulator as shown.

In Fig. 13 I have shown the manner in which a number of lines, and the bus bar to which they are connected, may be protected by a single electrolytic arrester or battery of arresters. The bus bar 32 is connected through an oil switch 33, and through the current transformer 34 with the step-up transformer 35, the other side of which is connected to the generator. The outgoing feeder lines 36 and 37 are fed by the bus bar 32. The feeder line 37 is connected through an open air switch 37ª to the choke coil 38, the other side of which is connected to the bus bar 32 through the current transformer 39, and the oil switch 40. The bus bar 32 is connected by the open air switch 41 to the horn electrode 42 which has a coöperating electrode 43 connected to the arrester bus 44. The feeder 37 is also connected by an open air switch 45 to one of the electrodes 46 of a suitable horn gap, the other electrode 47 being connected to the arrester bus 44. The feeder 36 which is supplied with apparatus similar to the feeder 37 connected by an open air switch 48 to the horn electrode 49, the coöperating horn 50 being connected to the arrester bus 44. The arrester bus 44 is connected to the electrolytic cell arrester 6 which is grounded at 7. It can be seen that a disturbance arising anywhere on the system has free access to the arrester apparatus without passing through any of the central station apparatus. In a similar manner, a disturbance arising within the station has an opportunity to discharge through the electrolytic arrester without injuring the central station apparatus or without placing a dangerous potential upon the line.

The system shown in Fig. 10 is more extensive than the system shown in Fig. 13 in that a greater number of feeders 3ª, 3ᵇ, 3ᶜ, 3ᵈ, and 3ᵉ, are connected to the high tension bus. The high tension bus is divided or sectionalized into a number of parts 53 and 54, each section being fed by a separate transformer 52 and 51 respectively. Each section of the high tension bus is connected through a horn gap 55 or 56 to the arrester bus 57, which is connected through the electrolytic arrester 6 to ground at 7. The sections of the bus may be connected together by a suitable switch 58. Each of the lines, 3ª, 3ᵇ, etc., is connected by a suitable horn gap to the arrester bus 57 so that complete protection may be had, both for the central station and for the transmission lines by employing a single electrolytic arrester 6.

Fig. 8 illustrates the manner in which protection for the feeders and central station apparatus or incoming lines and substation apparatus may be obtained. The system is a three phase grounded neutral system employing four arresters so that the single grounded arrester is connected in series with one of the others when a discharge occurs from the line to ground. Each of the three line wires 61, 62 and 63 is provided with a choke coil in series therewith and a line on each side of the choke coil is connected to a suitable horn gap, the common electrodes of which are connected to the electrolytic arresters, 64, 65 and 66 respectively, and each of these electrolytic arresters is connected in series with the grounded arrester 67. The arresters 66 and 67 are provided with a change-over switch 68 for charging the same.

Fig. 9 illustrates diagrammatically how the invention may be applied to protect any piece of apparatus which is subject to disturbances originating on opposite sides thereof. Where a feeder branch is led off into territory in which the operating company does not maintain a substation, it is desirable to meter the output to this sub-feeder at a point adjacent to the main transmission line. The metering mechanism is subject to disturbances arising upon the transmission line or upon the feeder line. Heretofore no scheme of protection has been practicable for protecting both sides of the metering equipment. According to my invention I connect the arrester on both sides of the metering equipment preferably inserting choke coils 70 and 71 on each side of the metering apparatus. In some cases I depend upon the impedance of the series transformer 72 to cause the potential wave to jump the gap and go to ground through the arrester 6. The feeder 76 may be connected or disconnected from the transmission line 74 by means of the switch 77. This scheme of protection may be employed not only to the metering equipment 73 but to any other piece of apparatus upon the line. It may even be found desirable to protect insulators at particularly exposed points on the line against destruction by the above invention.

It can be seen from the above description that I have provided a very efficient scheme of protection against potential surges, lightning discharges and the like, at a cost far below any system heretofore devised. The protection thus rendered is far more effective than has been found possible heretofore in the art, and due to eliminating shut-downs and destruction of apparatus, an increase in efficiency of the entire system is obtained.

What I claim is:

1. In combination, a transmission line, a bus, surge retarding means between said line and said bus, an electrolytic arrester having a ground connection, separate spark gaps connecting said electrolytic arrester to each side of said surge retarding means and a charging resistance for charging said electrolytic arrester.

2. In a horn gap arrester, a horn formed of a curved channel of sheet metal, said channel being bent to present a spherical face at the point of discharge formation, and means fitting into the concave side of said channel for supporting said horn.

3. In combination a supporting bracket, an inductance coil, an insulator for suspending said coil below said bracket, a pair of insulators above said bracket, horn gap electrodes mounted on said insulators, connecting wires for joining said horn electrodes to the terminals of said coil, a third insulator mounted between said latter two insulators above said bracket, horn electrode means for forming a pair of gaps with said horn electrodes, transmission wires connected to said horn electrodes and a ground connection for said electrode means.

4. In a lightning arrester, a plurality of parallel resistance rods, metal clips joining the ends of said rods in series, said clips comprising each a casting having a pair of sockets, bolts for springing said sockets upon the ends of said rods, said clips having a body joining said sockets, said body having a flange projecting laterally toward adjacent clips for defining spark gaps.

5. In combination a transmission line to be protected, a plurality of inductance or retardation coils connected in series with the dynamic current flowing in said line to prevent the passage of surges and the like, said transmission line being thereby divided into sections for causing a tendency to localize or confine surges or the like disturbances arising in a given section to that particular section, means in shunt of each inductance or retardation coil for dissipating and by-passing said disturbances arising upon a section, whereby said disturbances may be discharged to ground or a part of the same discharged to an adjacent section of the line, said means comprising an electrode connected to one side of the inductance coil, an electrode connected to the other side of the inductance coil, electrode means between said electrodes and adapted to form independent spark gaps with said electrode, a ground connection for said electrode means and means for resisting or limiting the passage of dynamic current through said grounded connections.

6. In combination a transmission line to be protected, said line having surge limiting means connected in series with the dynamic current normally passing along the line, said surge limiting means comprising an inductance coil tending to prevent surges from passing along the same path as the dynamic current thereby tending to localize the disturbance, a normally open shunt of large capacity around said inductance coil for relieving disturbances arising upon either side of said coil, said open shunt including a pair of spark gaps, the central part of said shunt between said spark gaps being grounded and means for limiting the flow of dynamic current from said central part of the shunt to ground.

7. In combination an electrical transmission line to be protected, said line being divided into adjacent sections, said adjacent sections being separated by surge retarding means tending to localize or confine a disturbance in the section in which it arises, said means comprising an inductance coil connected in series with each adjacent section, means in shunt of said inductance coil for dissipating the disturbances arising upon either of the adjacent sections, said means comprising a spark gap electrode connected to one terminal of said inductance coil, another spark gap electrode connected to the other terminal of the inductance coil and coöperating spark gap electrode means between said electrodes and adapted to form independent spark gaps with said electrodes in said shunt, a ground connection for said electrode means and means for resisting and limiting the passage of dynamic current from said electrode means to ground, said shunt being organized to permit the by-passing of part of a disturbance around said inductance coil to the adjacent section in the event of a failure of said ground connection to discharge said disturbance to ground.

8. In combination a transmission line to be protected, said line having surge limiting means connected in series with a dynamic current normally passing along the line, said surge limiting means comprising an inductance coil tending to prevent surges from passing along the same path as the dynamic current, thereby tending to localize the disturbance, a normally open shunt of large capacity about said inductance coil for relieving disturbances arising upon either side of said coil, each side of said open shunt terminating in a spark electrode, a ground connection having electrode means lying electrically between said electrode and means for limiting the dynamic current which tends to follow a discharge from said shunt to ground.

In witness whereof, I hereunto subscribe my name this 27th day of September A. D. 1915.

ALFRED HERZ.